US005518451A

United States Patent [19]
Renz et al.

[11] Patent Number: 5,518,451
[45] Date of Patent: May 21, 1996

[54] CLEAN ROOM SYSTEM

[75] Inventors: Manfred Renz, Ditzingen; Rudolf Simon, Korntal-Munchingen; Ulrich Eser, Tamm, all of Germany

[73] Assignee: Meissner & Wurst GmbH & Co. Lufttechnisch Anlagen Gebäude- und Verfahrenstechnik, Stuttgart, Germany

[21] Appl. No.: 297,444

[22] Filed: Aug. 26, 1994

[30] Foreign Application Priority Data

Aug. 28, 1993 [DE] Germany .......................... 43 28 995.9

[51] Int. Cl.6 ...................................................... F24F 3/16
[52] U.S. Cl. ........................... 454/187; 181/225; 454/906
[58] Field of Search .................................. 181/224, 225; 454/187, 228, 230, 233, 236, 906

[56] References Cited

U.S. PATENT DOCUMENTS

| 1,916,908 | 7/1933 | Stacey, Jr. et al. | 454/906 X |
| 1,964,845 | 7/1934 | Dietze et al. | 181/224 X |
| 2,112,608 | 3/1938 | Schmidt | 454/906 X |
| 2,270,825 | 1/1942 | Parkinson et al. | 181/224 |
| 3,125,286 | 3/1964 | Sanders | 454/906 X |
| 3,975,995 | 8/1976 | Shuler . | |
| 4,362,223 | 12/1982 | Meier | 181/224 X |
| 4,608,066 | 8/1986 | Cadwell, Jr. | 454/231 X |
| 4,747,341 | 5/1988 | Hedrick . | |
| 5,326,317 | 7/1994 | Ishizu et al. | 181/224 X |

FOREIGN PATENT DOCUMENTS

| 3621452 | 6/1986 | Germany . | |
| 150656 | 6/1990 | Japan | 454/187 |
| 23616 | 1/1991 | Japan | 454/187 |

OTHER PUBLICATIONS

Fritz Mode; Ventilatoranlagen; 1972; pp. 22–25.
U. Ackermann; Schalldampfer fur Raumlufttechnische Anlagen; 1992; pp. 255–265.

Primary Examiner—Harold Joyce
Attorney, Agent, or Firm—Robert W. Becker

[57] ABSTRACT

A clean room system has at least one clean room through which clean air is guided. The clean room has a bottom through which the clean air exits. At least one blower for sucking the clean air from the clean room through the bottom is provided. The blower is in the form of an axial blower operating at low pressure. At least one inlet channel for introducing the clean air leaving the blower into the clean room is provided. Filter units are positioned at the ceiling of the clean room for filtering the clean air before entering the clean room.

48 Claims, 4 Drawing Sheets

CLEAN ROOM SYSTEM

BACKGROUND OF THE INVENTION

The present invention relates to a clean room system with at least one clean room through which clean air is guided so as to exit the clean room through the bottom by being sucked from the clean room with at least one blower wherein the clean air is introduced via at least one inlet channel into the clean room by being passed through filters within the ceiling area of the clean room.

In such known clean room systems the clean air exiting from the clean room via the bottom is guided through a prefilter, a flap array arranged downstream, a heat exchanger, and a sound muffling device ("Kulissenschalldämpfer") before reaching the blower which is preferably in the form of an axial fan. At the pressure side of the fan a further sound muffling device (Kulissenschalldämpfer") is arranged. Due to this arrangement a great pressure loss occurs during operation. The axial fan is therefore embodied as a medium pressure or high pressure fan with high throughput velocities. Accordingly, downstream of the fan an additional, relatively long diffusor is arranged in order to regain at least a portion of the high-dynamic pressure component in the form of usable static pressure. The pressure loss at the prefilter is within the range of approximately 150 to 180 Pa. Pressure losses of a similar magnitude are caused by the two muffling devices. Together with the pressure loss of the mechanical filters for removing suspended particles the static pressure loss to be overcome by the fan in such clean room systems is typically within the range of approximately 500 to 700 Pa. For such pressure ranges axial fans are preferably used which due to their construction have a high dynamic pressure component of approximately 300 to 400 Pa which can be regained only partially in the form of usable static pressure with a downstream diffusor. This known construction, in addition to the high installment costs for ventilator, diffusor, and muffling devices, incurs high operational costs. With such known clean room systems it is thus not possible to operate cost-efficiently.

It is therefore an object of the present invention to improve the clean room system of the aforementioned kind such that the pressure losses during operation can be kept at a minimum so that the clean room system can be operated cost-efficiently.

SUMMARY OF THE INVENTION

The clean room system of the present invention is primarily characterized by:

At least one clean room through which clean air is guided;

The clean room has a bottom through which the clean air exits;

At least one blower for sucking the clean air from the clean room through the bottom;

The blower being an axial blower operating at low pressure;

At least one inlet channel for introducing the clean air leaving the blower into the clean room; and Filter units positioned at the ceiling of the clean room for filtering the clean air before entering the clean room.

Preferably, the clean room system further comprises an auxiliary room, in which the axial blower is located, and at least one flap array positioned upstream of the axial blower.

Advantageously, the clean room system further comprises a sound reflecting device, wherein the axial blower has a suction side and a pressure side and wherein the sound reflecting device is positioned at a distance from the pressure side of the axial blower so as to extend substantially perpendicular to a direction of air flow leaving the axial blower. Advantageously, the sound reflecting device is the ceiling of the auxiliary room.

Expediently, the inlet channel is inclined relative to an axis of the axial blower, and preferably is positioned perpendicularly to the axis of the axial blower.

Advantageously, the clean room system further comprises at least one muffler device (sound muffling device) positioned upstream of the axial blower, the muffler device comprised of at least two parallel, spaced apart plates extending in the axial direction of the axial blower and forming between adjacent ones of the parallel spaced apart plates a flow channel. Preferably, the parallel, spaced apart plates each have a different length. Advantageously, the parallel, spaced apart plates each have a different thickness. In a preferred embodiment of the present invention the shortest one of the parallel, spaced apart plates has the greatest thickness.

In yet another embodiment of the present invention, the parallel, spaced apart plates are spaced at different distances from one another. A shortest one of the parallel, spaced apart plates has preferably the shortest distance to a neighboring one of the parallel, spaced apart plates and the shortest plates preferably also has the greatest thickness.

Preferably, the parallel, spaced apart plates are spaced at different distances from one another. In this embodiment, the size of the parallel, spaced apart plates and the distance between the parallel, spaced apart plates are selected such that in each flow channel the same sound muffling effect is achieved.

Preferably, the parallel, spaced apart plates each have a different thickness.

Advantageously, the parallel, spaced apart plates are comprised of soundproofing material or comprised of at least one membrane absorber.

In a preferred embodiment of the present invention, the parallel, spaced apart plates have ends facing the axial blower, the ends being arranged at a same level.

In another embodiment of the present invention, the clean room system further comprises at least one muffler device positioned downstream of the axial blower, the muffler device comprised of at least two parallel, spaced apart plates.

Advantageously, the parallel, spaced apart plates each have a different length and expediently each have a different thickness. Advantageously, the shortest one of the parallel, spaced apart plates has the greatest thickness. Advantageously, the parallel spaced apart plates are spaced at different distances from one another. The shortest one of the parallel, spaced apart plates has the shortest distance to a neighboring one of the parallel, spaced apart plates. Preferably, the shortest plate has also the greatest thickness.

Advantageously, the parallel spaced apart plates each have a different thickness. Preferably, the parallel spaced apart plates are spaced at different distances from one another.

In a preferred embodiment of the present invention, the parallel, spaced apart plates are inclined relative to an axis of axial blower, preferably positioned perpendicular to the axis of the axial blower.

The parallel, spaced apart plates are preferably comprised of sound proofing material or comprised of at least one membrane absorber.

In a preferred embodiment of the present invention, the parallel, spaced apart plates have ends facing the inlet channel, the ends being arranged at a same level.

Advantageously, walls of the auxiliary room in the vicinity of the axial blower are at least partially provided with a means for sound proofing, whereby the means for sound proofing is preferably a wall lining made of sound proofing material. The means for sound proofing may also be in the form of at least one membrane absorber.

Preferably, the inlet channel has at least one means for soundproofing, preferably arranged at the ceiling of the inlet channel. The means for soundproofing is preferably spaced from the ceiling and is in the form of a lining made of soundproofing material or in the form of at least one membrane absorber.

In the inventive clean room system the clean air exiting from the clean room is preferably guided without filtering to the axial blower. Inventively, in the flow area between the clean room and the axial blower a prefilter is not required. Furthermore, the arrangement of muffling devices ("Kulissenschalldämpfer) on the pressure and suction side of the blower or fan is obsolete. This considerably reduces the pressure losses of the system resulting from inserts within the flow area. Due to the very small pressure losses, that are essentially caused only by the filter units arranged at the ceiling of the clean room for removing particles suspended in the air, it is now sufficient to provide an axial blower for circulating the clean air that operates at low pressure and has a great flow cross-section and thus only a small dynamic pressure component of approximately 20 to 70 Pa. This means that the additional energy required due to the dynamic pressure component is very small even without a downstream diffusor. With the inventive arrangement the static pressure difference to be overcome by the axial blower is thus lowered approximately 120 to 250 Pa for a vertical displacement flow within the clean room of, for example, approximately 0.45 m/s. An axial blower designed for low pressure operation can be used up to a static pressure difference of approximately 300 Pa. Blowers of this kind are very inexpensive and have a comparatively low noise emission. The noise level within the clean room can thus be kept at a low level without the use of conventionally required complicated muffling devices ("Kulissenschalldämpfer") with the disclosed simple inventive measures. The inventive clean room system thus has the advantage of considerably lower investment and operating costs.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 1:
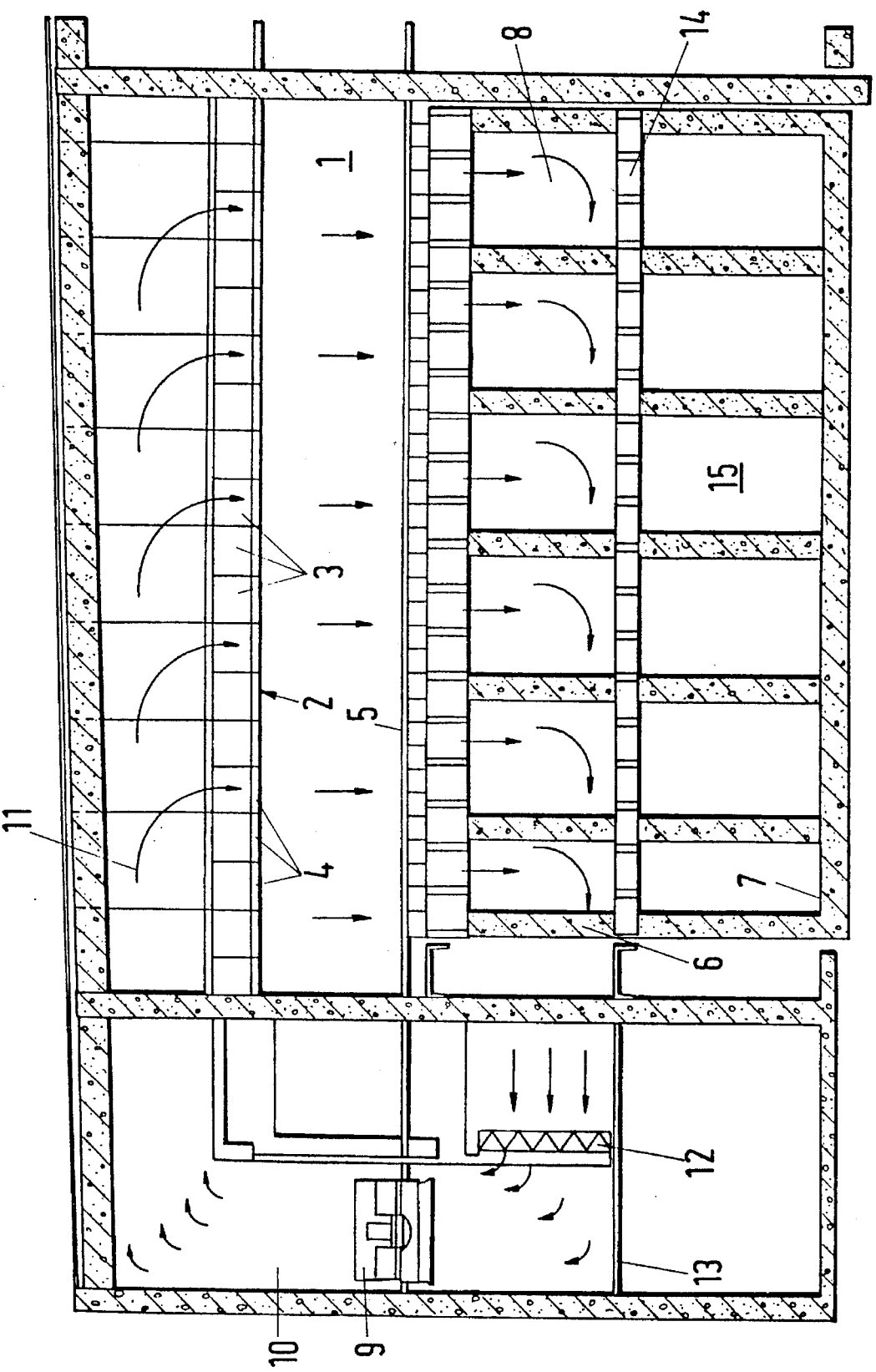
FIG. 1 shows a first embodiment of the inventive clean room system.

FIG. 1 shows in cross-section a clean room system that comprises at least one clean room 1. A clean air stream is vertically guided through the clean room 1. The ceiling 2 of the clean room 1 is formed by adjacently positioned filter units 3 which are arranged in abutting rows side by side and one after another. They are of a conventional design and need not be discussed in detail. The clean air is downwardly guided through the filter units 3 in order to be introduced into the clean room 1. The filter units 3 are arranged and connected within the ceiling area of the clean room 1 in a grid-type arrangement in a manner known per se.

The clean room has a double bottom 5 through which the clean air flows in a downward direction out of the clean room 1. The double bottom 5 is supported via supports 6 on a foundation 7.

Clean air flows uniformly through the clean room 1 and enters via the double bottom 5 the return chamber 8 from where the clean air is sucked with at least one axial blower 9. The axial blower 9 is positioned in an auxiliary room 10 which is sealed relative to the clean room 1. The clean air sucked in by the axial blower 9, as indicated by the flow arrows in FIG. 1, is then conveyed into the inlet channel 11 which is arranged in an area above the filter units 3. From here the clean air enters again the individual filter units 3. In the aforementioned manner the clean air is thus recirculated within the clean room system. The axial blower 9 in the auxiliary room 10 is only provided with a flap array 12 arranged upstream of the blower 9. The array 12 extends over the entire height and length of the flow path of the clean air within the auxiliary room 10. The flap array 12 is required in order to be able to switch off individual blower areas when a plurality of blowers are arranged in the longitudinal direction of the building so that no air can flow counter to the desired flow direction toward the suction side of the blower 9. The flap array 12, which during operation of the axial blower 9 is fully opened, is located on a bottom 13 which is arranged at a distance above the foundation 7. Below the double bottom 5 of the clean room 1 an intermediate ceiling 14 is arranged at the level of the bottom 13 of the auxiliary chamber 10. The intermediate ceiling 14 is air tight and serves partly as a deflecting means for the clean air penetrating the double bottom 5. Below the intermediate ceiling 14 and the bottom 13 a basement area 15 is provided where devices machinery etc. can be accommodated.

Depending on the width, respectively, length of the clean room 1 a plurality of axial blowers 9 are arranged spaced at a distance adjacent to one another or in-line. This ensures that the clean air is guided into the inlet channel 11 above the filter units 3 over the entire length or width of the channel 11. The inlet channel 11 can have such a height that service personnel can enter it in order to, for example, carry out repair or maintenance work at the filter units 3.

Between the axial blower 9 and the double bottom 5 no prefilters and/or sound muffling devices are provided so that within this flow area only a very small pressure loss occurs caused substantially only by the mechanical filters 4 of the filter units 3. These pressure losses for the aforementioned flow velocity of the clean air of approximately 0.45 m/s are within a range of approximately 80 to 120 Pa. Thus, the inventive clean room system has the advantage of low energy costs and correspondingly low operating costs. The axial blowers 9 are designed to operate within low pressure ranges. The low pressure range in the context of the present invention is defined to extend up to a static pressure difference of approximately 300 Pa. Within this pressure range the axial blowers 9 have the following advantages: they provide great flow cross-sections and thus only a small flow velocity of approximately 6 to 11 m/s; they are inexpensive and have, due to their low flow velocities, only a small dynamic pressure component; and they produce only a very low noise level. Accordingly, no or only minimal additional sound muffling devices and/or sound proofing measures are required. Due to the very low pressure losses the clean room system according to FIG. 1 provides a constructively simple and thus very inexpensive design.

Figure 2:
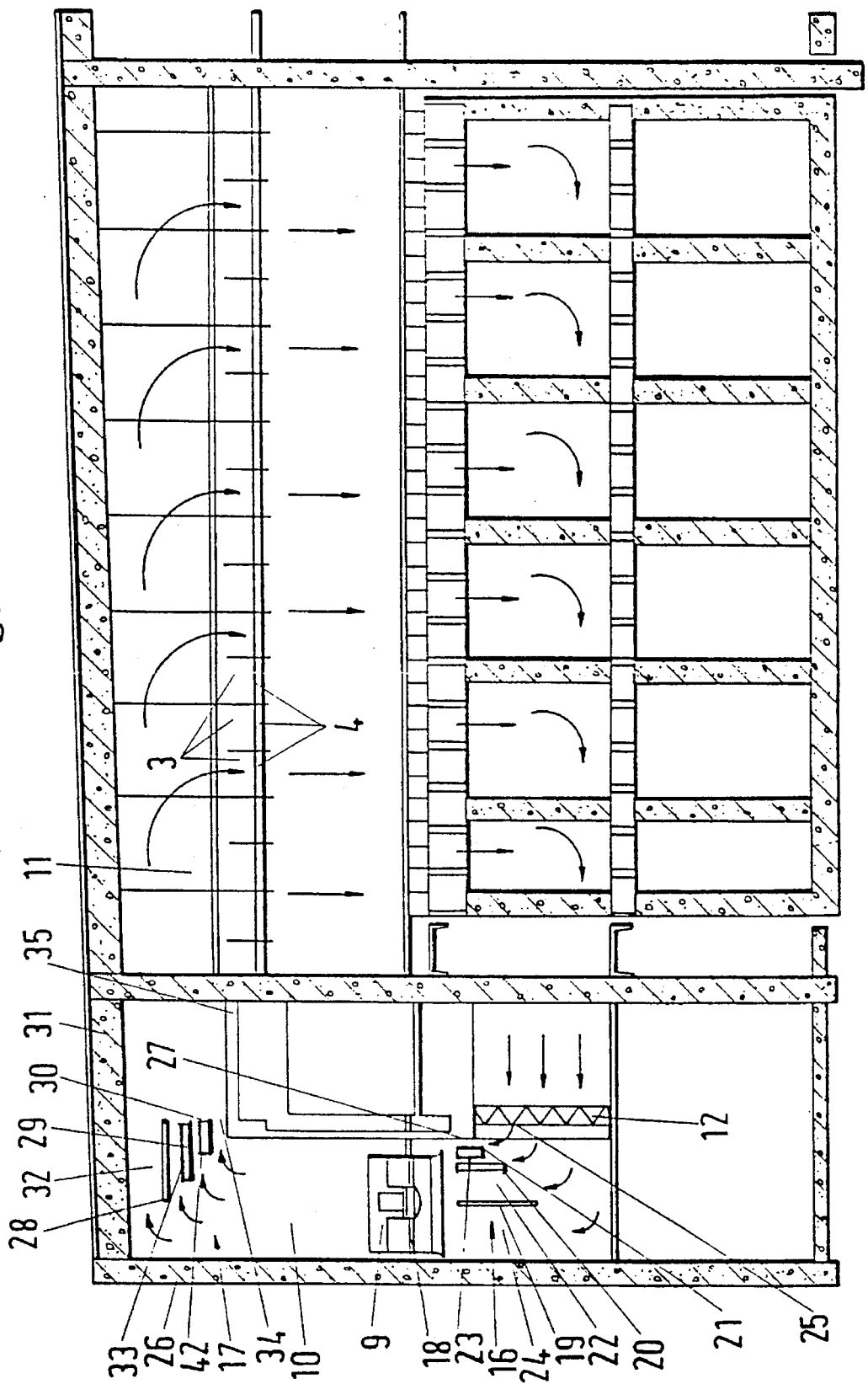
FIG. 2 shows in a representation corresponding to FIG. 1 a second embodiment of an inventive clean room system.

FIG. 2 shows a clean room system that differs from the embodiment of FIG. 1 only by the arrangement of sound muffling devices (muffler devices) 16 and 17 upstream and downstream of the axial blower 9. Both muffler devices 16, 17 are arranged within the auxiliary room 10. In analogy to the aforedescribed embodiment of FIG. 1 the axial blowers 9 are arranged in an intermediate ceiling 18 which divides the auxiliary room 10. The axial blowers 9 can be easily mounted within the intermediate ceiling 18.

The muffler device 16 within the suction area of the axial blower 9 is in the form of plates 19 to 21 spaced apart from one another and extending advantageously over the entire length of the auxiliary room 10. These plates 19 to 21 are comprised of any suitable soundproofing material, preferably of a material that does not expel any gasses. They can also be made of an element that is lined or coated with a soundproofing material. For example, it is possible to use membrane absorbers as a muffling device 16. The plates 19 to 21 have different lengths in the flow direction of the clean air. The plate 21 which is closest to the flap array 12 has the shortest length of the three plates. The neighboring plate 20 is longer than the plate 21 but shorter than the plate 19. The distance between the plates 21 and 20 is shorter than the distance between the plates 20 and 19. The staggering of the lengths of the plates, the varying thickness of the plates, as well as the different distances between the plates 19 to 21 are selected such that over the suction area of the axial blower 9 a uniform suction of clean air as well as a uniform sound muffling or soundproofing can be achieved. The plates 19 to 21 extend parallel relative to one another in the vertical direction. The ends of the plates 19 to 21 facing the axial blower 9 are arranged at the same horizontal level (see FIG. 2). These plates 19 to 21 serve not only for sound muffling purposes, but also as guiding devices for the clean air. This ensures that the clean air is optimally sucked in by the axial blower 9. Between the plates 19, 20 and the plates 20, 21 a flow channel 22, 23 is formed, respectively. Furthermore, flow channels 24 and 25 between the plates 19 and the neighboring side wall 26 of the auxiliary room 10 as well as between the plate 21 and the neighboring wall 27 of the auxiliary room 10 are formed. The clean air which via the flap array 12 enters the auxiliary room 10 substantially horizontally is thus deflected after passing through the flap array 12 at a right angle and flows through the flow channels 22 to 25 in uniform distribution to the axial blower 9.

The sound muffling device (muffler device) 17 within the flow area downstream of the axial blower 9 serves not only for muffling the sound, but also as a guiding device for the clean air. The sound muffling device 17 is formed by three parallel plates 28 to 30 which in the direction of flow of the clean air have different lengths. The distance between the plates 28 and 29 is greater than the distance between the plates 29 and 30. Between the plate 28 and the neighboring ceiling 31 of the inlet channel 11 a flow channel 32 is formed. Another flow channel 33 is formed between the plates 28 and 29. The plates 29 and 30 delimit a third flow channel 42. A fourth flow channel 34 is formed between the plate 30 and the neighboring wall 35 within the auxiliary room 10. The plate 30 which extends parallel to the wall 35 has the shortest length, while the plate 28 positioned adjacent to the ceiling 31 has the greatest length. The length of the plates 28 to 30, their thickness and their distance relative to one another as well as to the ceiling 31 and the wall 35 are again selected such that the clean air flows in a uniform flow distribution into the inlet channel 11 and that at the same time a uniform sound muffling effect is achieved. The ends of the plates 28 to 30 facing the inlet channel 11 are arranged at the same vertical level (plane). The plates 28 to 30 can be comprised of any suitable soundproofing material, preferably of a material that does not release or expel any gases, or can be made of an element that is coated with a respective soundproofing material. As shown in FIG. 2, the plates 28 to 30 are horizontally arranged and extend at a right angle to the plates 19 to 21 of the muffler device 16. The clean air is deflected at a right angle by the plates 28 to 30.

As shown in the embodiment of FIG. 1, the ceiling 31 of the clean room system is positioned substantially at a right angle to the exit direction of the axial blower 9. This has the advantage that at the ceiling 31 a portion of the sound is reflected back to the axial blower 9 and is not reflected in the direction toward the clean room 1. This results in an additional noise level reduction.

The plates 28 to 30 of the muffler device 17 can extend in the horizontal direction farther in direction toward the inlet channel 11 so that an even greater sound muffling effect is achieved. The plates 28 to 30 extend over the entire width of the auxiliary room 10. They are spaced at a distance from the vertical side wall 26 of the clean room system.

The embodiment according to FIG. 2 also has the advantage of a simple constructive design. It operates at a very low noise level and, as the design according to FIG. 1, has only very small pressure losses which are generated substantially only by the mechanical filters of the filter fan units 3. Due to the low pressure losses, as explained in connection with the first embodiment, the axial blower 9 is sufficient for effectively conveying the clean air. The axial blowers 9 operate very quietly so that no or only very limited additional soundproofing measures must be taken. Furthermore, the axial blowers 9 have only a very short axial length so that they require only a minimal construction space. The embodiment according to FIG. 2 thus only incurs minimal operating costs and requires only little energy. Therefore, it is possible to operate the inventive clean room system at low cost.

In another, non-represented embodiment it is possible to eliminate the muffler device 16 within the suction area of the axial blower 9. In this case, only the muffler device 17 within the flow area downstream of the axial blower 9 is provided. Such a clean room system is even more cost-efficient with respect to its manufacture than the embodiment according to FIG. 2.

Figure 3:
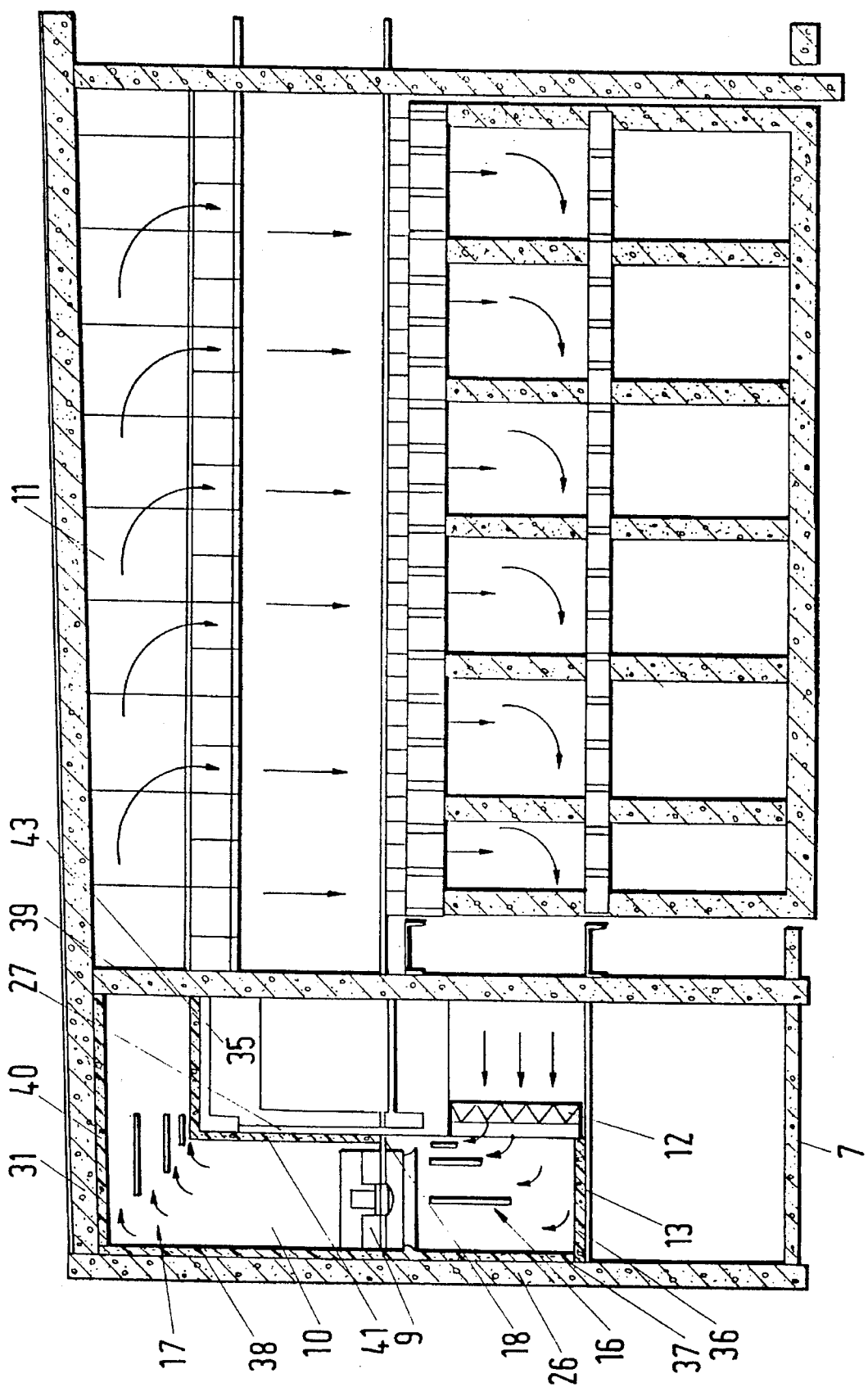
FIG. 3 shows a third embodiment of the inventive clean room system in a representation corresponding to FIG. 1.

The clean room system according to FIG. 3 is substantially identical to the embodiment of FIG. 2. The difference is that the sidewalls of the auxiliary room 10 of the clean room system are provided with soundproofing material so that an extremely high soundproofing effect can be achieved. The bottom 13 of the auxiliary room 10 in the area between the flap array 12 and the vertical sidewall 26 is also provided with soundproofing material 36. The sidewall 26 in the area between the lining 36 and the axial blower 9 is also provided with a soundproofing lining 37. In the area between the intermediate ceiling 18 of the auxiliary room 10 and the ceiling 31 of the clean room system the sidewall 26 is provided with a further soundproofing lining 38. The ceiling 31 in the area between the lining 38 and a vertical wall 39 separating the clean room 1 relative to the auxiliary room 10 is also provided with a soundproofing lining 40. The wall 39 forms the limiting wall of the auxiliary room 10 positioned opposite to the sidewall 26 which extends from the ceiling 31 to the foundation 7 of the clean room system. In order to allow passage of clean air from auxiliary room 10 into the inlet channel 11 and from return chamber 8 into the auxiliary room 10, the wall 39 is provided with corresponding perforations.

The wall 27, extending at a distance parallel to the sidewall 26 within the auxiliary room 10, is also provided with a soundproofing lining 41. This lining 41 extends from the intermediate ceiling 18 over the entire height and width of the wall 27. As in the previous embodiments, the wall 35 extends at a right angle from the wall 27, at a distance from the ceiling 31. The wall 35 is also provided with a soundproofing lining 43.

Due to the soundproofing linings 36 to 38, 40, 41, 43 an extremely high soundproofing effect is achieved which in connection with the muffler devices 16 and 17 result in a very low noise level during operation of the clean room system. Since the embodiment according to FIG. 3 is otherwise identical to the embodiment of FIG. 2 further details can be taken from the description of the embodiment of FIG. 2.

In the aforementioned embodiments the axial blowers 9 are positioned at one end of the clean room system. With correspondingly large clean rooms 1 it is possible to provide axial blowers also at the opposite sidewalls of the clean room system in a respective auxiliary room and to arrange, if required, further muffler devices therein. The clean room system can be provided with more than one clean room 1. The muffler devices 16 and 17 may be provided with only two or with more than three plates, depending on the respective installation conditions and system specifications.

Figure 4:
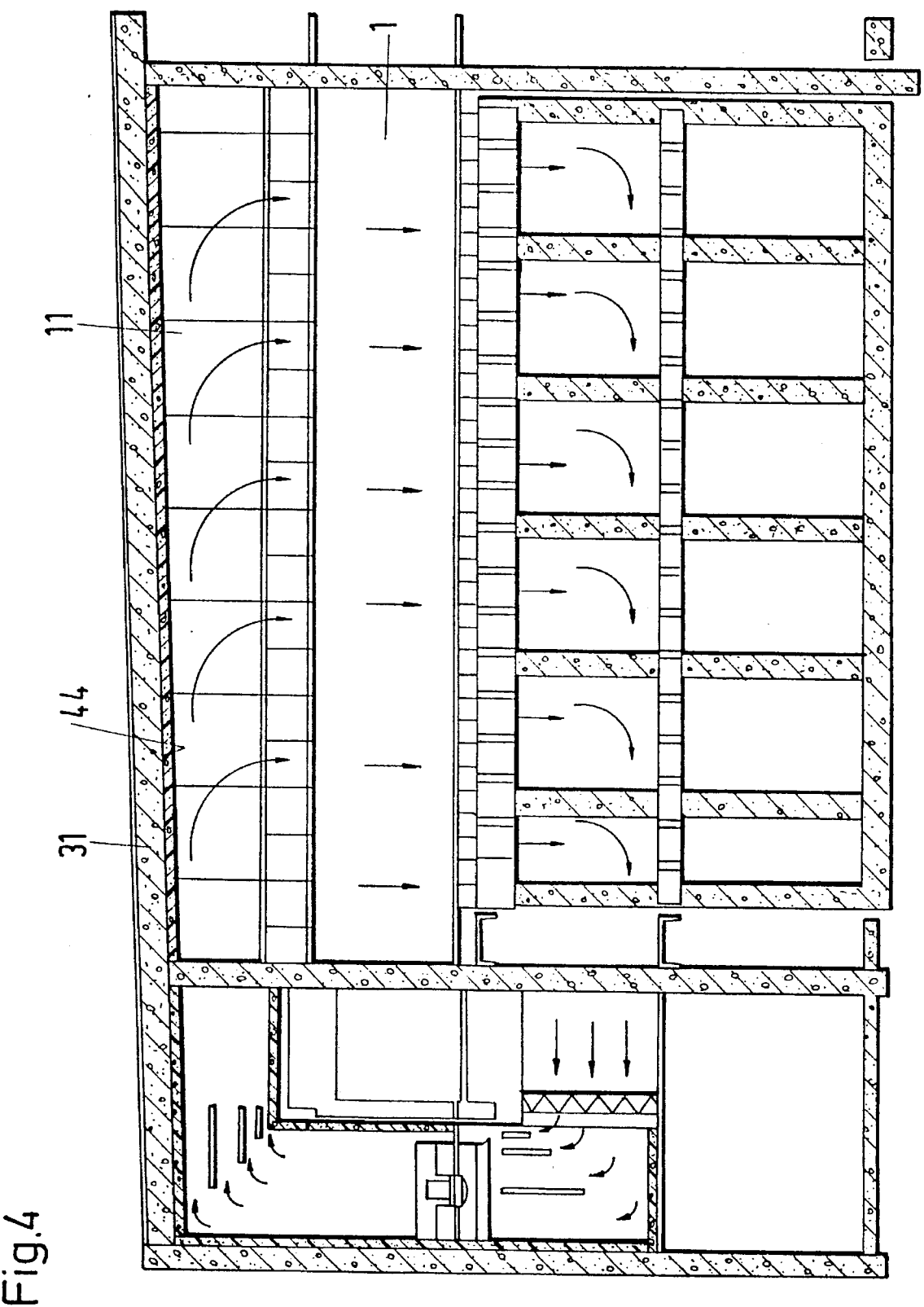
FIG. 4 shows in a representation corresponding to FIG. 1 a fourth embodiment of the inventive clean room system.

FIG. 4 shows an embodiment of a clean room system in which the ceiling 31 in the area of the inlet channel 11 is provided with a soundproofing lining 44. This lining 44 can be comprised of a suitable soundproofing material. The ceiling 31 can also be provided with one or more membrane absorbers that can be used as muffer devices. The ceiling 31 in the area of the inlet channel 11 is advantageously provided over its entire surface area with a lining 44. Thus, an optimal soundproofing is ensured so that in the clean room 1 positioned below only a very small noise level results. The soundproofing components can be positioned at a distance from ceiling 31 within the inlet channel 11, i.e., they can be suspended from the ceiling 31. This also results in an excellent soundproofing. In order to allow passage of clean air, it is possible to provide a spacing between individual or between all soundproofing components. The embodiment of FIG. 4 is otherwise identical to the embodiment of FIG. 3. The clean room system of FIG. 4, however, can also be designed according to the embodiments of FIGS. 1 and 2.

As an alternative to the represented embodiments, the clean room system can also have any other suitable design. It is only important that the ceiling 31 of the inlet channel 11 (the so-called plenum) is provided with soundproofing components, respectively, with membrane absorbers to that in the area of the plenum a very good soundproofing effect is achieved.

The present invention is, of course, in no way restricted to the specific disclosure of the specification and drawings, but also encompasses any modifications within the scope of the appended claims.

What we claim is:

1. A clean room system comprising:

at least one clean room through which clean air is guided;

said clean room having a bottom through which the clean air exits;

at least one blower for sucking the clean air from the clean room through said bottom;

at least one inlet channel for introducing the clean air leaving said blower into said clean room;

filter units positioned at the ceiling of the clean room for filtering the clean air before entering said clean room;

at least one first muffler device positioned upstream of said blower, said first muffler device comprised of first parallel, spaced apart plates, wherein said first parallel, spaced apart plates are spaced at different distances from one another, wherein each one of said first parallel, spaced apart plates has a different length in a direction of flow of the clean air, and wherein a shortest one of said first parallel, spaced apart plates has the smallest distance to a neighboring one of said first parallel, spaced apart plates.

2. A clean room system according to claim 1, further comprising:

an auxiliary room in which said blower is located; and at least one flap array positioned upstream of said blower.

3. A clean room system according to claim 2, further comprising a sound reflecting device, wherein said blower has a suction side and a pressure side and wherein said sound reflecting device is positioned at a distance from said pressure side of said blower so as to extend substantially perpendicular to a direction of air flow leaving said blower.

4. A clean room system according to claim 3, wherein said sound reflecting device is a ceiling of said auxiliary room.

5. A clean room system according to claim 1, wherein said inlet channel is positioned perpendicular to an axis of said blower.

6. A clean room system according to claim 1, wherein said first parallel, spaced apart plates extend in an axial direction of said blower.

7. A clean room system according to claim 1, wherein said first parallel, spaced apart plates each have a different thickness.

8. A clean room system according to claim 7, wherein said shortest one of said first parallel, spaced apart plates has the greatest thickness.

9. A clean room system according to claim 1, wherein a size of said first parallel, spaced apart plates and the distance between said first parallel, spaced apart plates are selected such that in each flow channel defined between two adjacent ones of said first parallel, spaced apart plates the same sound muffling effect is achieved.

10. A clean room system according to claim 1, wherein said first parallel, spaced apart plates are comprised of soundproofing material.

11. A clean room system according to claim 1, wherein each of said first parallel, spaced apart plates is comprised of at least one membrane absorber.

12. A clean room system according to claim 1, wherein said first parallel, spaced apart plates have ends facing said blower, said ends being arranged at a same level.

13. A clean room system according to claim 1, further comprising at least one second muffler device positioned downstream of said blower, said second muffler device comprised of second parallel, spaced apart plates, wherein said second parallel, spaced apart plates are spaced at different distances from one another, wherein each one of said second parallel, spaced apart plates has a different length in a direction of flow of the clean air, and wherein a shortest one of said second parallel, spaced apart plates has the smallest distance to a neighboring one of said second parallel, spaced apart plates.

14. A clean room system according to claim 13, wherein said second parallel, spaced apart plates each have a different thickness.

15. A clean room system according to claim 14, wherein said shortest one of said second parallel, spaced apart plates has the greatest thickness.

16. A clean room system according to claim 13, wherein said second parallel, spaced apart plates are positioned perpendicular to an axis of said blower.

17. A clean room system according to claim 13, wherein said second parallel, spaced apart plates are comprised of soundproofing material.

18. A clean room system according to claim 13, wherein each of said second parallel, spaced apart plates is comprised of at least one membrane absorber.

19. A clean room system according to claim 13, wherein said second parallel, spaced apart plates have ends facing said inlet channel, said ends being arranged at a same level.

20. A clean room system according to claim 2, wherein walls of said auxiliary room in the vicinity of said blower are at least partially provided with a means for soundproofing.

21. A clean room system according to claim 20, wherein said means for soundproofing is a wall lining made of soundproofing material.

22. A clean room system according to claim 20, wherein said means for soundproofing is at least one membrane absorber.

23. A clean room system according to claim 1, wherein said inlet channel has at least one means for soundproofing.

24. A clean room system according to claim 23, wherein said means for soundproofing is arranged at a ceiling of said inlet channel.

25. A clean room system according to claim 24, wherein said means for soundproofing is spaced from said ceiling.

26. A clean room system according to claim 23, wherein said means for soundproofing is a lining made of a soundproofing material.

27. A clean room system according to claim 23, wherein said means for soundproofing is at least one membrane absorber.

28. A clean room system according to claim 13, wherein a size of said second parallel, spaced apart plates and the distance between said second parallel, spaced apart plates are selected such that in each flow channel defined between two adjacent ones of said second parallel, spaced apart plates the same sound muffling effect is achieved.

29. A clean room system comprising:

at least one clean room through which clean air is guided;

said clean room having a bottom through which the clean air exits;

at least one blower for sucking the clean air from the clean room through said bottom;

at least one inlet channel for introducing the clean air leaving said blower into said clean room;

filter units positioned at the ceiling of the clean room for filtering the clean air before entering said clean room;

at least one muffler device positioned downstream of said blower, said muffler device comprised of parallel, spaced apart plates, wherein said parallel, spaced apart plates are spaced at different distances from one another, wherein each one of said parallel, spaced apart plates has a different length in a direction of flow of the clean air, and wherein a shortest one of said parallel, spaced apart plates has the smallest distance to a neighboring one of said parallel, spaced apart plates.

30. A clean room system according to claim 29, further comprising:

an auxiliary room in which said blower is located; and at least one flap array positioned upstream of said blower.

31. A clean room system according to claim 30, further comprising a sound reflecting device, wherein said blower has a suction side and a pressure side and wherein said sound reflecting device is positioned at a distance from said pressure side of said blower so as to extend substantially perpendicular to a direction of air flow leaving said blower.

32. A clean room system according to claim 30, wherein said sound reflecting device is a ceiling of said auxiliary room.

33. A clean room system according to claim 29, wherein said inlet channel is positioned perpendicular to an axis of said blower.

34. A clean room system according to claim 29, wherein said parallel, spaced apart plates are positioned perpendicular to an axis of said blower.

35. A clean room system according to claim 29, wherein said parallel, spaced apart plates each have a different thickness.

36. A clean room system according to claim 35, wherein said shortest one of said parallel, spaced apart plates has the greatest thickness.

37. A clean room system according to claim 29, wherein a size of said parallel, spaced apart plates and the distance between said parallel, spaced apart plates are selected such that in each flow channel defined between two adjacent ones of said first parallel, spaced apart plates the same sound muffling effect is achieved.

38. A clean room system according to claim 29, wherein said parallel, spaced apart plates are comprised of soundproofing material.

39. A clean room system according to claim 29, wherein each of said parallel, spaced apart plates is comprised of at least one membrane absorber.

40. A clean room system according to claim 29, wherein said parallel, spaced apart plates have ends facing said inlet channel, said ends being arranged at a same level.

41. A clean room system according to claim 29, wherein walls of said auxiliary room in the vicinity of said blower are at least partially provided with a means for soundproofing.

42. A clean room system according to claim 41, wherein said means for soundproofing is a wall lining made of soundproofing material.

43. A clean room system according to claim 41, wherein said means for soundproofing is at least one membrane absorber.

44. A clean room system according to claim 29, wherein said inlet channel has at least one means for soundproofing.

45. A clean room system according to claim 44, wherein said means for soundproofing is arranged at a ceiling of said inlet channel.

46. A clean room system according to claim 45, wherein said means for soundproofing is spaced from said ceiling.

47. A clean room system according to claim 44, wherein said means for soundproofing is a lining made of a soundproofing material.

48. A clean room system according to claim 44, wherein said means for soundproofing is at least one membrane absorber.

* * * * *

UNITED STATES PATENT AND TRADEMARK OFFICE
CERTIFICATE OF CORRECTION

PATENT NO.  : 5,518,451
DATED       : May 21, 1996
INVENTOR(S) : Renz et al

It is certified that error appears in the above-indentified patent and that said Letters Patent is hereby corrected as shown below:

On the title page:

[73] Assignee: Meissner + Wurst GmbH + Co.
                Lufttechnische Anlagen Gebäude- und
                Verfahrenstechnik, Stuttgart, Germany Signed and Sealed this Twenty-seventh Day of August, 1996

Attest:

BRUCE LEHMAN

*Attesting Officer*  *Commissioner of Patents and Trademarks*